US008079123B2

(12) United States Patent
Lin

(10) Patent No.: US 8,079,123 B2

(45) Date of Patent: Dec. 20, 2011

(54) PULLER THAT IS ASSEMBLED AND DISASSEMBLED EASILY AND QUICKLY

(75) Inventor: Liang-Hui Lin, Taiping (TW)

(73) Assignee: Arestool Co., Ltd., Taichung County (TW)

( * ) Notice: Subject to any disclaimer, the term of this patent is extended or adjusted under 35 U.S.C. 154(b) by 511 days.

(21) Appl. No.: 12/270,069

(22) Filed: Nov. 13, 2008

(65) Prior Publication Data

US 2010/0115748 A1 May 13, 2010

(51) Int. Cl.
*B23P 19/04* (2006.01)

(52) U.S. Cl. ................. 29/259; 29/255; 29/270; 29/278

(58) Field of Classification Search ............ 29/251–268, 29/270–278

See application file for complete search history.

(56) References Cited

U.S. PATENT DOCUMENTS

| | | | | |
|---|---|---|---|---|
| 5,887,328 | A * | 3/1999 | Rydin et al. | 29/259 |
| 5,896,639 | A * | 4/1999 | Chen | 29/261 |
| 6,266,859 | B1 * | 7/2001 | Hernandez | 29/256 |
| 6,609,283 | B1 * | 8/2003 | Somerville | 29/262 |
| 6,665,918 | B1 * | 12/2003 | Williams | 29/259 |
| 6,895,646 | B1 * | 5/2005 | Houg | 29/252 |
| 7,216,409 | B1 * | 5/2007 | Chiu et al. | 29/259 |
| 7,685,689 | B1 * | 3/2010 | Del Castello | 29/281.1 |
| 7,908,724 | B2 * | 3/2011 | Isabelle | 29/260 |
| 2010/0115748 | A1 * | 5/2010 | Lin | 29/259 |

* cited by examiner

*Primary Examiner* — Lee D Wilson

(74) *Attorney, Agent, or Firm* — Alan Kamrath; Kamrath IP Lawfirm, PA

(57) ABSTRACT

A puller includes a main body provided with a plurality of support seats, a plurality of clamping members each pivotally and detachably mounted on a respective one of the support seats, a top cover mounted on the main body and provided with a plurality of pressing pieces each pressing a respective one of the clamping members, and a threaded rod extending through the top cover and the main body. Thus, each of the clamping members is pivotable relative to the respective support seat of the main body so as to adjust the inclined angle of each of the clamping members relative to the respective support seat. In addition, each of the clamping members is locked onto and unlocked from the respective support seat easily and quickly.

18 Claims, 8 Drawing Sheets

PULLER THAT IS ASSEMBLED AND DISASSEMBLED EASILY AND QUICKLY

BACKGROUND OF THE INVENTION

1. Field of the Invention

The present invention relates to a puller and, more particularly, to a puller that is used to remove a mechanical accessory, such as a bearing, steering wheel, gear and the like.

2. Description of the Related Art

A conventional puller 1 in accordance with the prior art shown in FIG. 9 comprises a main body 11 having a periphery provided with a plurality of support seats 11, a plurality of clamping members 12 each mounted on a respective one of the support seats 111 of the main body 11 by a locking bolt 13 and a locking nut 130, and a threaded rod 14 screwed into the main body 11. Each of the support seats 111 of the main body 11 has a forked end portion provided with a receiving chamber 110. The receiving chamber 110 of each of the support seats 111 has two opposite sidewalls each provided with a through hole 112 to allow passage of the locking bolt 13. Each of the clamping members 12 has a first end pivotally mounted in the receiving chamber 110 of the respective support seat 111 and a second end provided with a locking hook 122. The first end of each of the clamping members 12 is formed with a through bore 121 to allow passage of the locking bolt 13. In operation, when the puller 1 is mounted on a mechanical accessory, such as a bearing, steering wheel, gear and the like, the locking hook 122 of each of the clamping members 12 is hooked onto the periphery of the mechanical accessory, and the distal end 140 of the threaded rod 14 abuts the mandrel of the mechanical accessory. Then, the threaded rod 14 is rotated relative to the main body 11, so that the distal end 140 of the threaded rod 14 is moved to press the mandrel of the mechanical accessory so as to remove the mechanical accessory from the mandrel. However, it is necessary to unscrew the locking bolt 13 from the locking nut 130 and to detach the locking bolt 13 from the respective support seat 111 of the main body 11 so as to remove each of the clamping members 12 from the respective support seat 111 of the main body 11, thereby causing inconvenience to the user.

BRIEF SUMMARY OF THE INVENTION

In accordance with the present invention, there is provided a puller, comprising a main body having a periphery provided with a plurality of support seats, a plurality of clamping members each pivotally and detachably mounted on a respective one of the support seats of the main body, a top cover mounted on the main body and having a periphery provided with a plurality of pressing pieces each pressing a respective one of the clamping members to limit the respective clamping member on the respective support seat of the main body, and a threaded rod extending through the top cover and the main body.

The primary objective of the present invention is to provide a puller that is assembled and disassembled easily and quickly.

Another objective of the present invention is to provide a puller, wherein the locking detent each of the pressing pieces of the top cover is locked onto any one of the locking teeth of the respective clamping member, so that the respective clamping member is pivotable relative to each of the support seats of the main body so as to adjust the inclined angle of the respective clamping member relative to each of the support seats of the main body.

A further objective of the present invention is to provide a puller, wherein the pivot block of each of the clamping members is locked in and unlocked from the pivot recess of the respective support seat by rotation of the pivot block of each of the clamping members relative to the respective support seat of the main body, so that each of the clamping members is locked onto and unlocked from the respective support seat of the main body easily and quickly, thereby facilitating a user mounting and detaching each of the clamping members.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
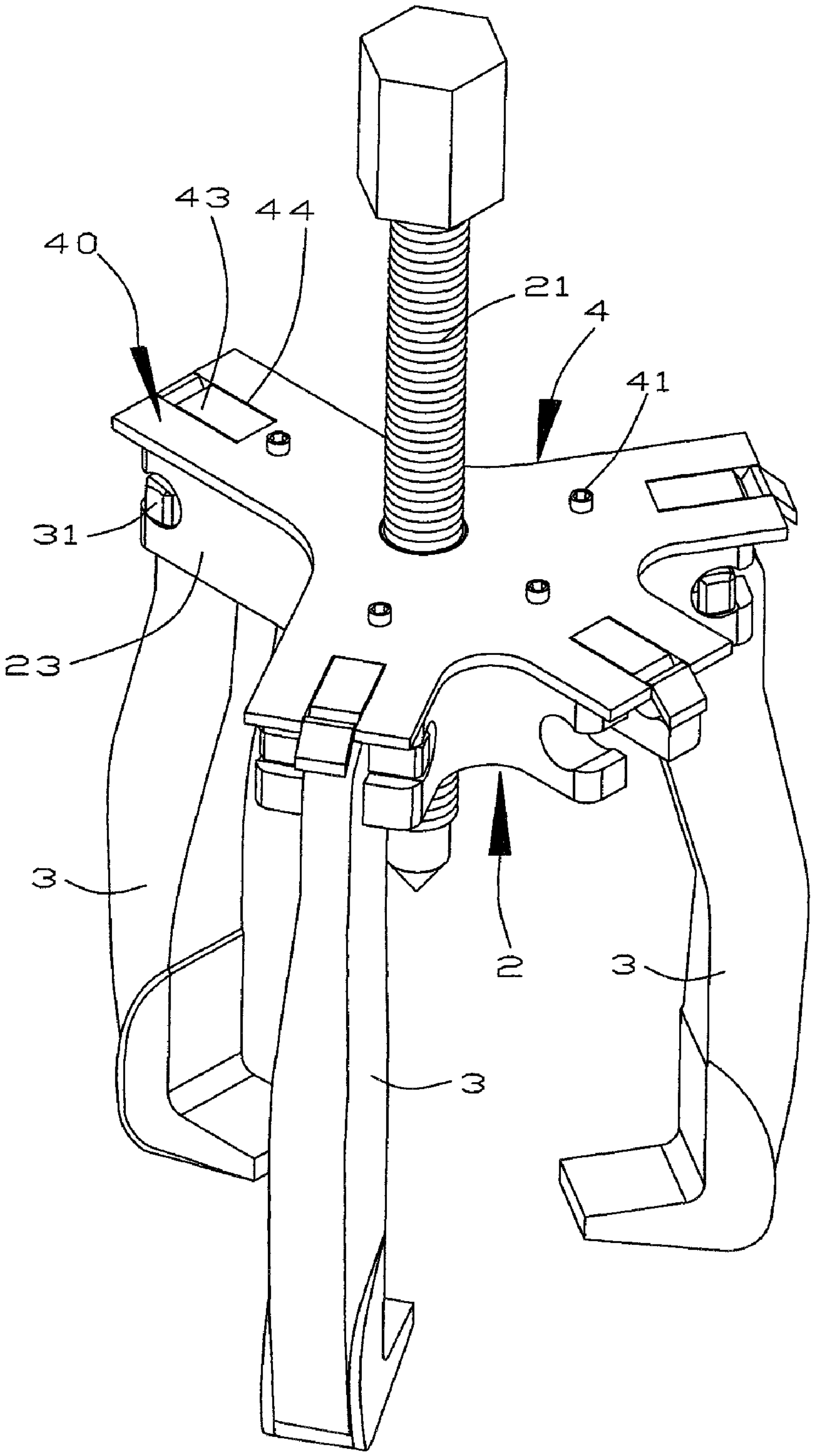
FIG. 1 is a perspective view of a puller in accordance with the preferred embodiment of the present invention.
Figure 2:
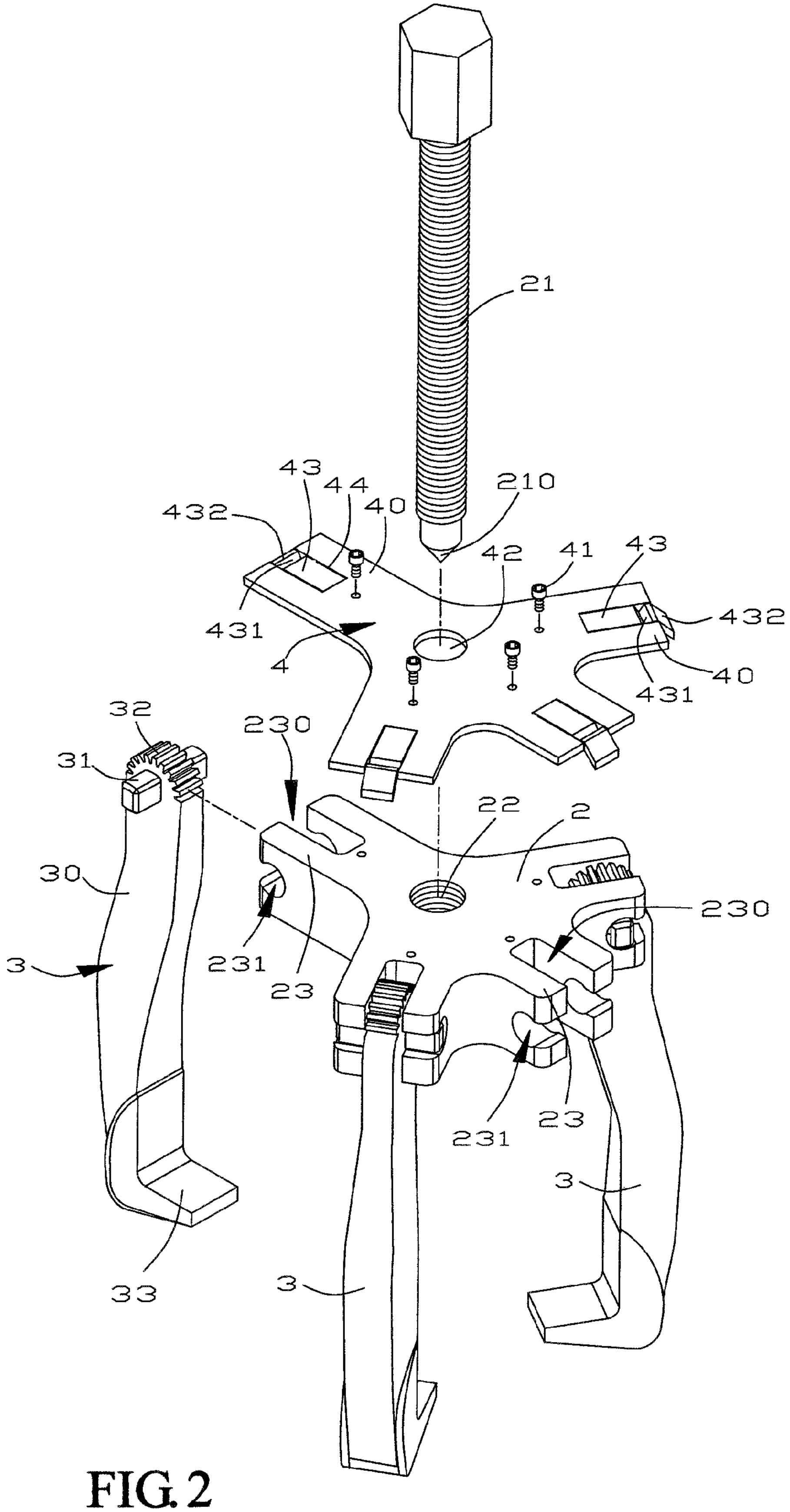
FIG. 2 is an exploded perspective view of the puller as shown in FIG. 1.
Figure 3:
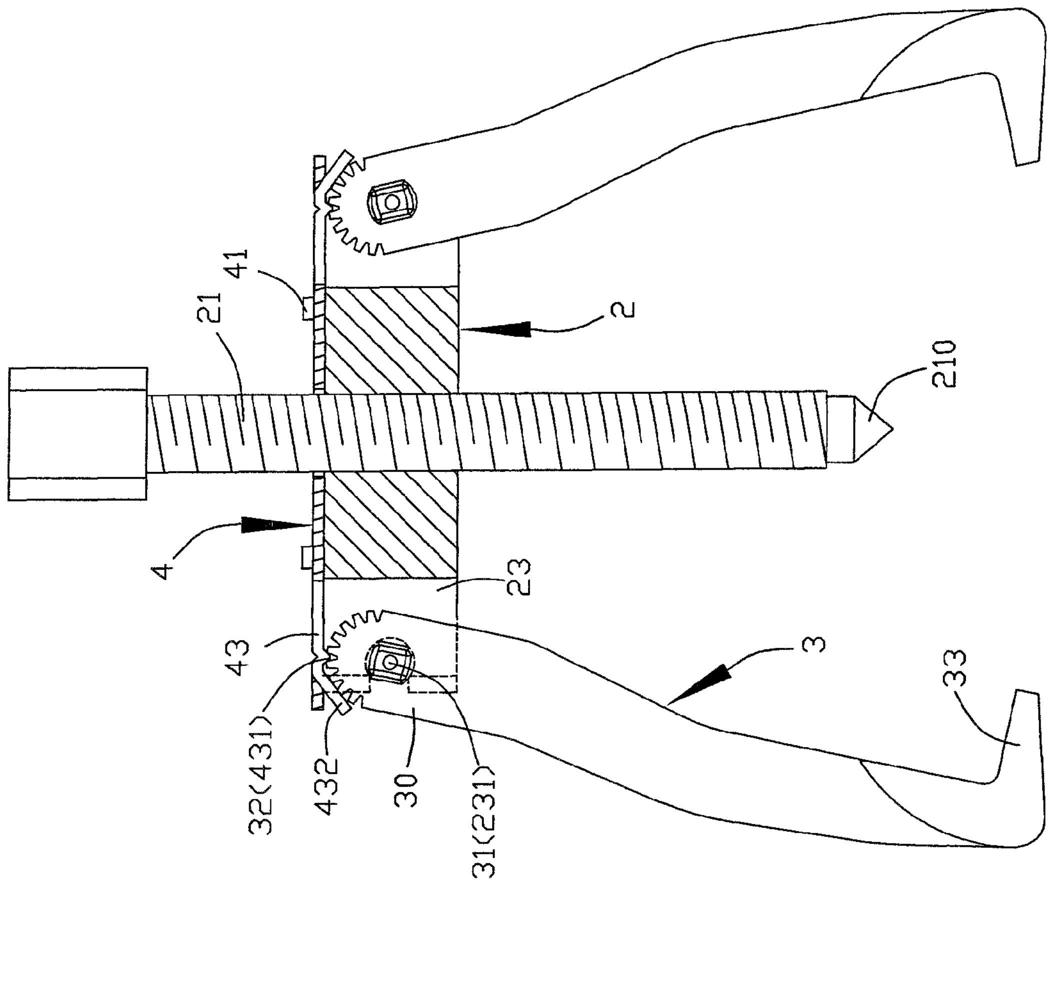
FIG. 3 is a front cross-sectional view of the puller as shown in FIG. 1.
Figure 4:
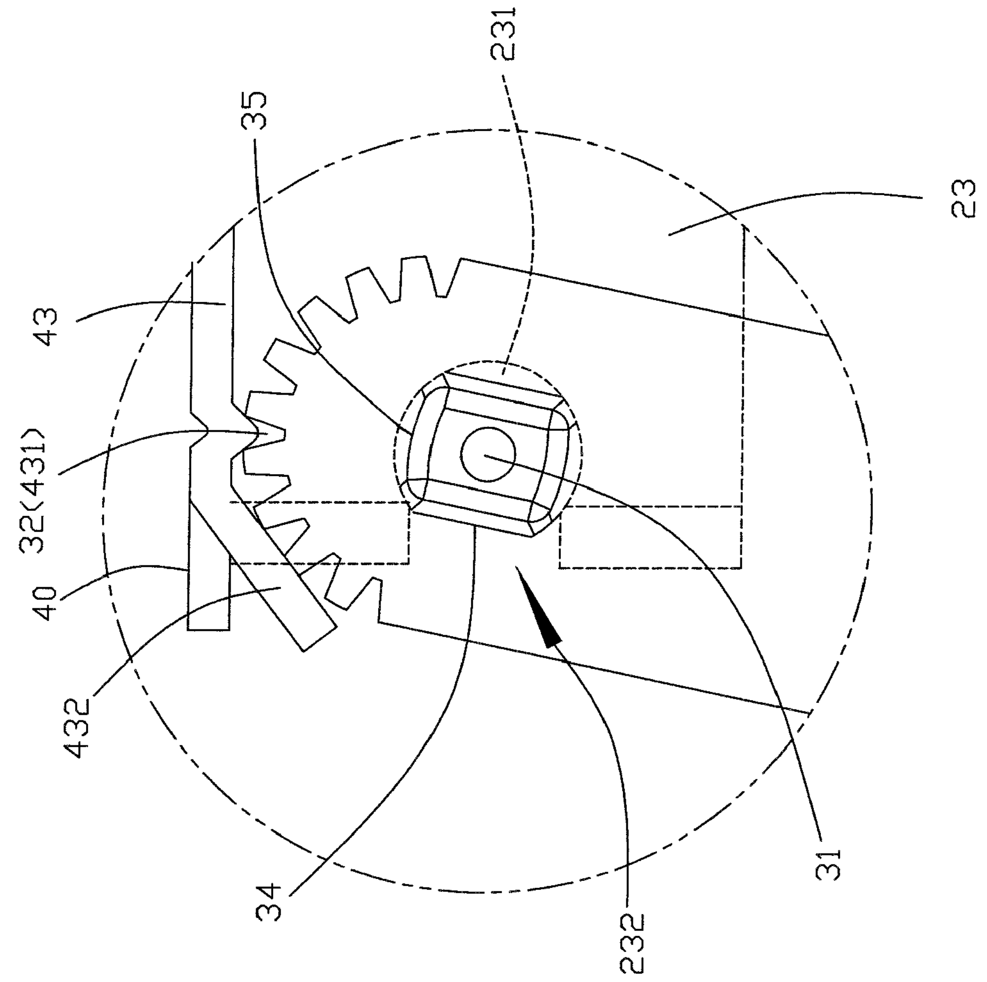
FIG. 4 is a locally enlarged view of the puller as shown in FIG. 3.
Figure 5:
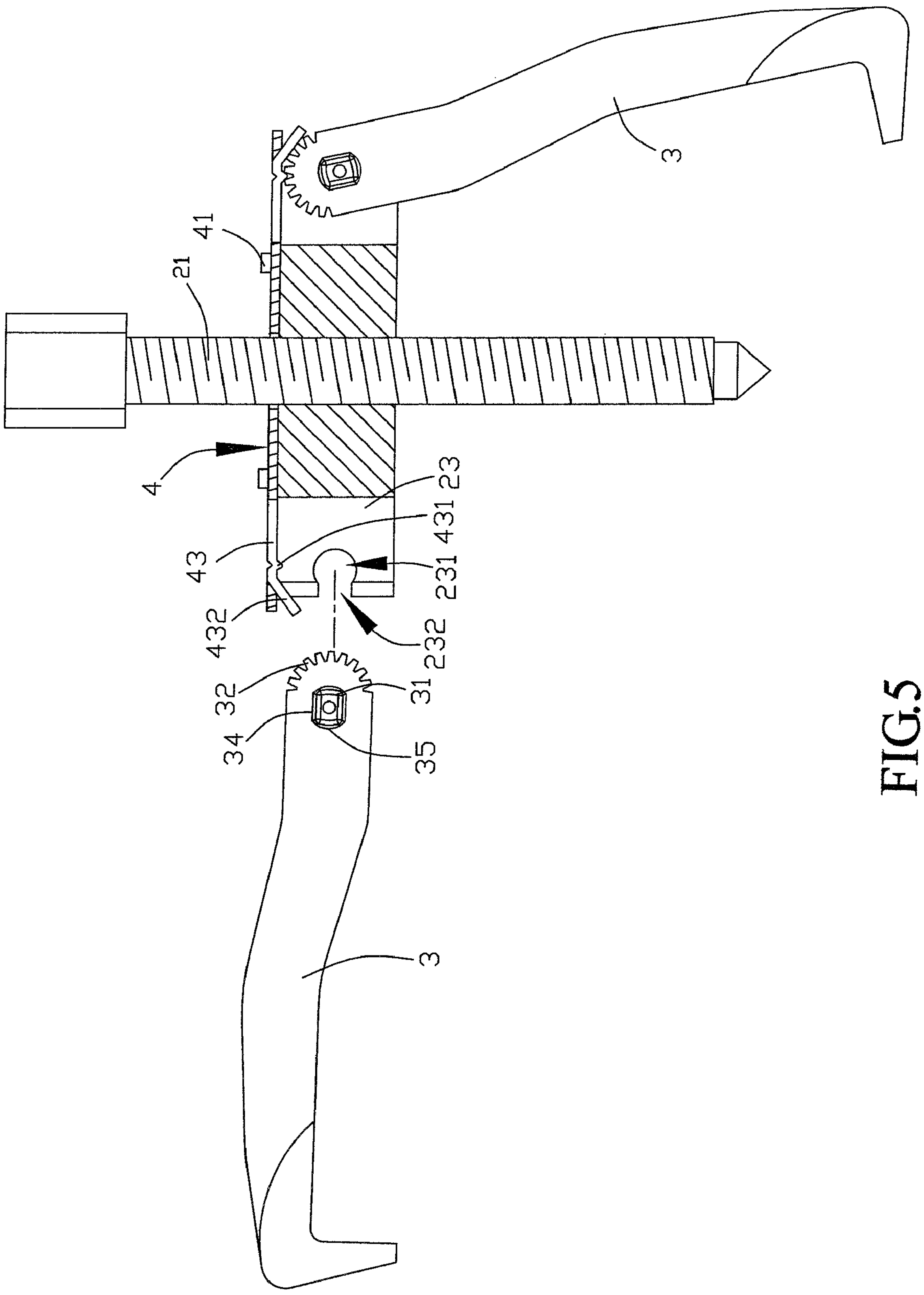
FIG. 5 is a partially exploded view of the puller as shown in FIG. 3.

Referring to the drawings and initially to FIGS. 1-6, a puller in accordance with the preferred embodiment of the present invention comprises a main body 2 having a periphery provided with a plurality of support seats 23, a plurality of clamping members 3 each pivotally and detachably mounted on a respective one of the support seats 23 of the main body 2, a top cover 4 mounted on the main body 2 and having a periphery provided with a plurality of pressing pieces 43 each pressing a respective one of the clamping members 3 to limit the respective clamping member 3 on the respective support seat 23 of the main body 2, and a threaded rod 21 extending through the top cover 4 and the main body 2.

The main body 2 has a central portion provided with a screw bore 22 screwed onto the threaded rod 21. Each of the support seats 23 of the main body 2 has a forked end portion provided with an upright receiving chamber 230. The receiving chamber 230 of each of the support seats 23 has two opposite sidewalls each provided with a pivot recess 231. The pivot recess 231 of each of the support seats 23 has a substantially circular shape and has an end face provided with an entrance 232 which has a size smaller than a diameter of the pivot recess 231.

Each of the clamping members 3 has a first end 30 pivotally mounted in the receiving chamber 230 of the respective support seat 23 and a second end provided with a locking hook 33. The first end 30 of each of the clamping members 3 has a periphery provided with a plurality of locking teeth 32 which are arranged in a semi-circular shape. The first end 30 of each of the clamping members 3 has two opposite sides each provided with a pivot block 31 pivotally mounted in the pivot recess 231 of the respective support seat 23. The pivot block 31 of each of the clamping members 3 functions as a rotation center of the locking teeth 32. The pivot block 31 of each of the clamping members 3 is inserted through the entrance 232 into the pivot recess 231 of the respective support seat 23. The pivot block 31 of each of the clamping members 3 has a substantially oblong shape and has two opposite first sides 34 and two opposite second sides 35, wherein a distance between the two first sides 34 of the pivot block 31 of each of the clamping members 3 is smaller than the size of the entrance 232 of the respective support seat 23, and a distance between the two second sides 35 of the pivot block 31 of each of the clamping members 3 is greater than the size of the entrance 232 of the respective support seat 23. Each of the two first sides 34 of the pivot block 31 of each of the clamping members 3 has a flat shape and extends in a longitudinal direction of each of the clamping members 3. Each of the two second sides 35 of the pivot block 31 of each of the clamping members 3 has a substantially arc-shaped profile and extends in a transverse direction of each of the clamping members 3.

Figure 6:
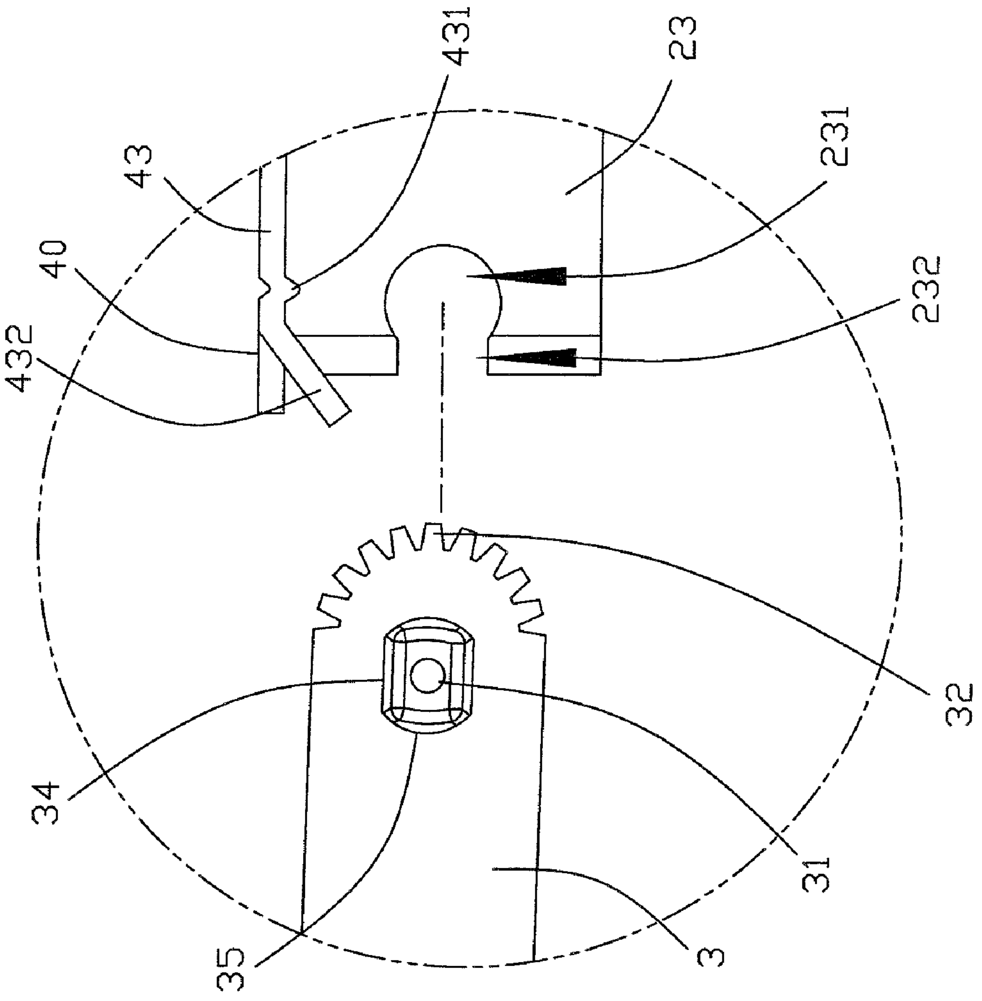
FIG. 6 is a locally enlarged view of the puller as shown in FIG. 5.
Figure 8:
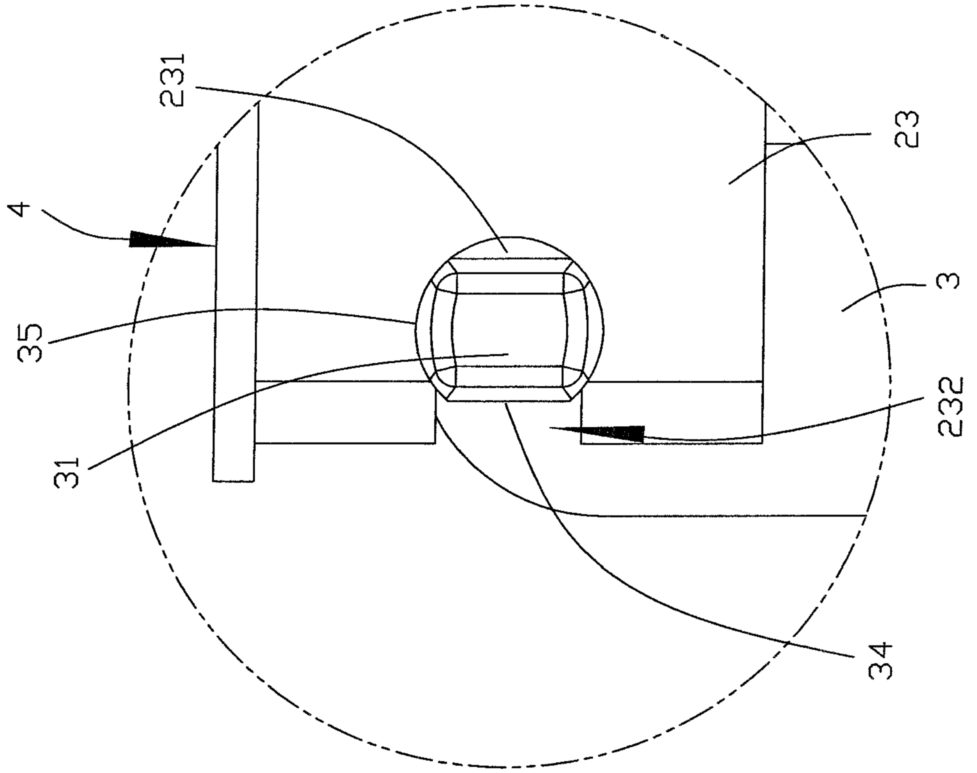
FIG. 8 is a schematic operational view of the puller as shown in FIG. 7 in assembly.
Figure 7:
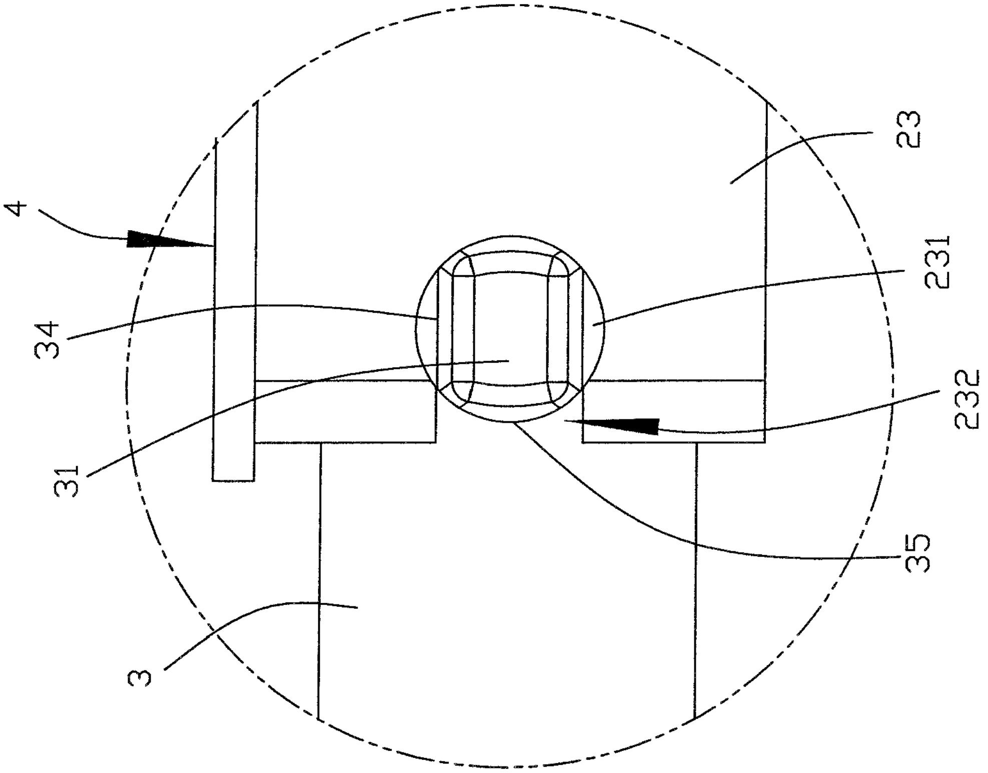
FIG. 7 is a schematic operational view of the puller as shown in FIG. 6 in assembly.
Figure 9:
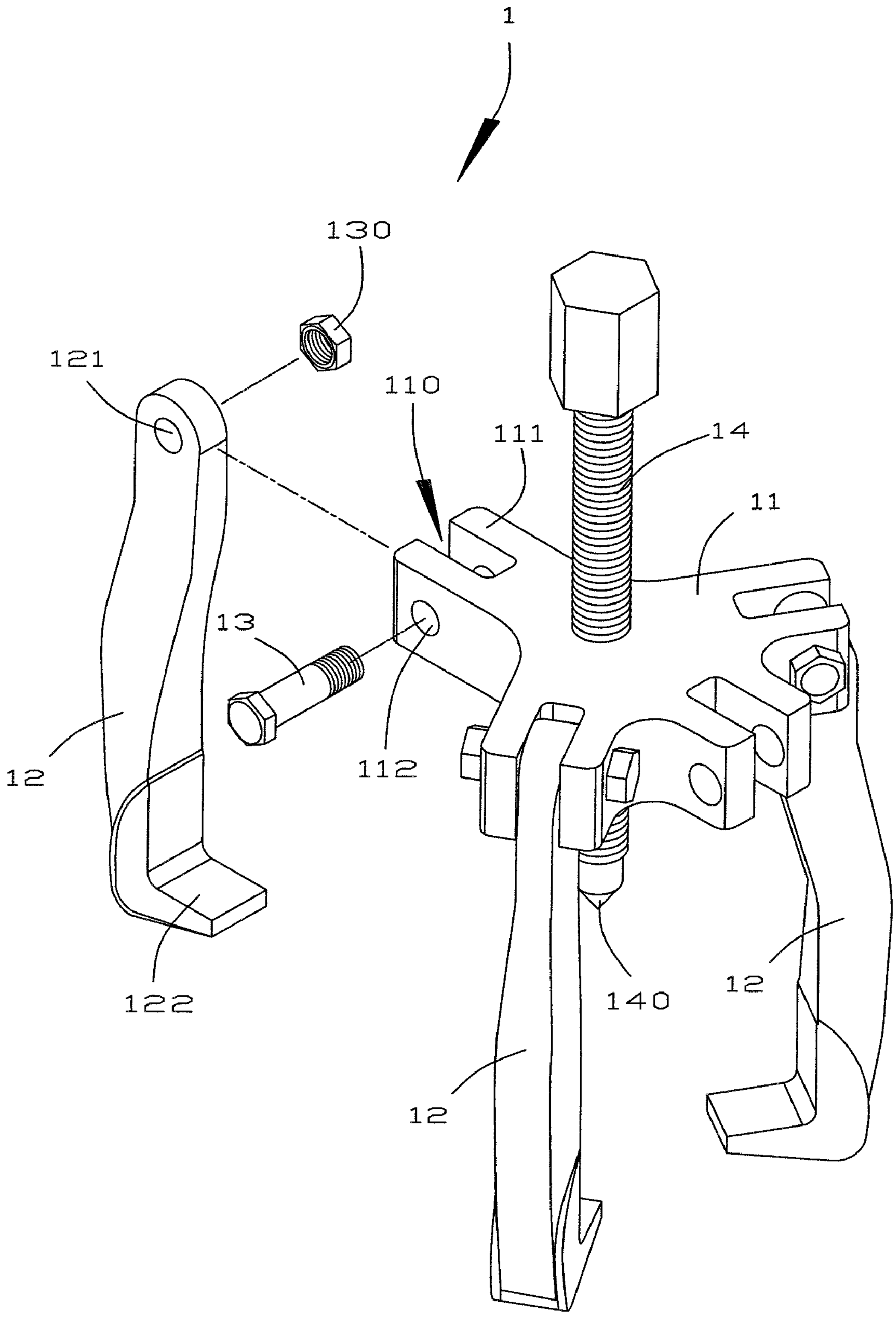
FIG.9 PRIOR ART
FIG. 9 is a partially exploded perspective view of a conventional puller in accordance with the prior art.

Thus, when the two first sides 34 of the pivot block 31 of each of the clamping members 3 align with the entrance 232 of the respective support seat 23 as shown in FIG. 6, the pivot block 31 of each of the clamping members 3 is allowed to extend through the entrance 232 into the pivot recess 231 of the respective support seat 23 as shown in FIG. 7, and when the two second sides 35 of the pivot block 31 of each of the clamping members 3 align with the entrance 232 of the respective support seat 23 as shown in FIG. 8, the pivot block 31 of each of the clamping members 3 is stopped by and cannot be detached from the entrance 232 of the respective support seat 23.

The top cover 4 is secured on the main body 2 by a plurality of locking screws 41. The top cover 4 has a central portion provided with a through hole 42 to allow passage of the threaded rod 21. The top cover 4 has a periphery provided with a plurality of forked resting plates 40 resting on a respective one of the support seats 23 of the main body 2. Each of the pressing pieces 43 of the top cover 4 is formed on a respective one of the resting plates 40, and two opposite slits 44 are defined between each of the pressing pieces 43 and the respective resting plate 40 of the top cover 4 so that each of the pressing pieces 43 of the top cover 4 is made flexible. Each of the pressing pieces 43 of the top cover 4 has a bottom provided with a locking detent 431 engaging with one of the locking teeth 32 of the respective clamping member 3 to lock the respective clamping member 3 onto each of the pressing pieces 43 of the top cover 4 and to adjust an inclined angle of the respective clamping member 3 relative to each of the support seats 23 of the main body 2. Each of the pressing pieces 43 of the top cover 4 has a distal end provided with an oblique limit plate 432 abutting the locking teeth 32 of the respective clamping member 3 to limit the respective clamping member 3 on each of the pressing pieces 43 of the top cover 4.

In operation, when the puller is mounted on a mechanical accessory, such as a bearing, steering wheel, gear and the like, the locking hook 33 of each of the clamping members 3 is hooked onto the periphery of the mechanical accessory, and the distal end 210 of the threaded rod 21 abuts the mandrel of the mechanical accessory. Then, the threaded rod 21 is rotated relative to the main body 2, so that the distal end 210 of the threaded rod 21 is moved to press the mandrel of the mechanical accessory so as to remove the mechanical accessory from the mandrel. In such a manner, each of the pressing pieces 43 of the top cover 4 is flexible and is movable upward by a pulling force to detach the locking detent 431 from the locking teeth 32 of the respective clamping member 3 to unlock the respective clamping member 3 from each of the pressing pieces 43 of the top cover 4, so that the respective clamping member 3 is pivotable relative to each of the support seats 23 of the main body 2 so as to adjust the inclined angle of the respective clamping member 3 relative to each of the support seats 23 of the main body 2. After adjustment of the inclined angle of the respective clamping member 3 relative to each of the support seats 23 of the main body 2 is finished, each of the pressing pieces 43 of the top cover 4 is released and is movable downward by its resilience to lock the locking detent 431 onto one of the locking teeth 32 of the respective clamping member 3 to lock the respective clamping member 3 onto each of the pressing pieces 43 of the top cover 4.

In assembly of each of the clamping members 3, referring to FIGS. 7 and 8 with reference to FIGS. 1-6, when the two first sides 34 of the pivot block 31 of each of the clamping members 3 align with the entrance 232 of the respective support seat 23 as shown in FIG. 6, the pivot block 31 of each of the clamping members 3 is allowed to extend through the entrance 232 into the pivot recess 231 of the respective support seat 23 as shown in FIG. 7. Then, the pivot block 31 of each of the clamping members 3 is rotated in the pivot recess 231 of the respective support seat 23. In such a manner, when the two second sides 35 of the pivot block 31 of the pivot block 31 of each of the clamping members 3 align with the entrance 232 of the respective support seat 23 as shown in FIG. 8, the pivot block 31 of each of the clamping members 3 is stopped by and cannot be detached from the entrance 232 of the respective support seat 23 so that each of the clamping members 3 is locked onto the respective support seat 23 of the main body 2.

Accordingly, the locking detent 431 each of the pressing pieces 43 of the top cover 4 is locked onto any one of the locking teeth 32 of the respective clamping member 3, so that the respective clamping member 3 is pivotable relative to each of the support seats 23 of the main body 2 so as to adjust the inclined angle of the respective clamping member 3 relative to each of the support seats 23 of the main body 2. In addition, the pivot block 31 of each of the clamping members 3 is locked in and unlocked from the pivot recess 231 of the respective support seat 23 by rotation of the pivot block 31 of each of the clamping members 3 relative to the respective support seat 23 of the main body 2, so that each of the clamping members 3 is locked onto and unlocked from the respective support seat 23 of the main body 2 easily and quickly, thereby facilitating a user mounting and detaching each of the clamping members 3.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A puller, comprising:

a main body having a periphery provided with a plurality of support seats;

a plurality of clamping members each pivotally and detachably mounted on a respective one of the support seats of the main body;

a top cover mounted on the main body and having a periphery provided with a plurality of pressing pieces each pressing a respective one of the clamping members to limit the respective clamping member on the respective support seat of the main body;

a threaded rod extending through the top cover and the main body;

wherein each of the support seats of the main body has a forked end portion provided with an upright receiving chamber;

the receiving chamber of each of the support seats has two opposite sidewalls each provided with a pivot recess;

each of the clamping members has a first end pivotally mounted in the receiving chamber of the respective support seat;

the first end of each of the clamping members has two opposite sides each provided with a pivot block pivotally mounted in the pivot recess of the respective support seat;

the first end of each of the clamping members has a periphery provided with a plurality of locking teeth;

each of the pressing pieces of the top cover has a bottom provided with a locking detent engaging with one of the locking teeth of the respective clamping member to lock the respective clamping member onto each of the pressing pieces of the top cover and to adjust an inclined angle of the respective clamping member relative to each of the support seats of the main body.

2. The puller of claim 1, wherein the pivot recess of each of the support seats has an end face provided with an entrance which has a size smaller than a diameter of the pivot recess.

3. The puller of claim 2, wherein the pivot block of each of the clamping members has two opposite first sides and two opposite second sides;

a distance between the two first sides of the pivot block of each of the clamping members is smaller than the size of the entrance of the respective support seat;

a distance between the two second sides of the pivot block of each of the clamping members is greater than the size of the entrance of the respective support seat.

4. The puller of claim 2, wherein the pivot block of each of the clamping members is inserted through the entrance into the pivot recess of the respective support seat.

5. The puller of claim 1, wherein each of the pressing pieces of the top cover has a distal end provided with an oblique limit plate abutting the locking teeth of the respective clamping member to limit the respective clamping member on each of the pressing pieces of the top cover.

6. The puller of claim 1, wherein the top cover is secured on the main body by a plurality of locking screws.

7. The puller of claim 1, wherein the main body has a central portion provided with a screw bore screwed onto the threaded rod;

the top cover has a central portion provided with a through hole to allow passage of the threaded rod.

8. The puller of claim 3, wherein when the two first sides of the pivot block of each of the clamping members align with the entrance of the respective support seat, the pivot block of each of the clamping members is allowed to extend through the entrance into the pivot recess of the respective support seat;

when the two second sides of the pivot block of each of the clamping members align with the entrance of the respective support seat, the pivot block of each of the clamping members is stopped by and cannot be detached from the entrance of the respective support seat.

9. The puller of claim 3, wherein each of the two first sides of the pivot block of each of the clamping members extends in a longitudinal direction of each of the clamping members;

each of the two second sides of the pivot block of each of the clamping members extends in a transverse direction of each of the clamping members.

10. The puller of claim 3, wherein each of the two first sides of the pivot block of each of the clamping members has a flat shape;

each of the two second sides of the pivot block of each of the clamping members has a substantially arc-shaped profile.

11. The puller of claim 1, wherein the top cover has a periphery provided with a plurality of forked resting plates resting on a respective one of the support seats of the main body.

12. The puller of claim 11, wherein each of the pressing pieces of the top cover is formed on a respective one of the resting plates;

two opposite slits are defined between each of the pressing pieces and the respective resting plate of the top cover so that each of the pressing pieces of the top cover is made flexible.

13. The puller of claim 3, wherein the pivot block of each of the clamping members has a substantially oblong shape.

14. The puller of claim 1, wherein the pivot block of each of the clamping members functions as a rotation center of the locking teeth.

15. The puller of claim 1, wherein the locking teeth of each of the clamping members are arranged in a semi-circular shape.

16. The puller of claim 1, wherein the pivot recess of each of the support seats has a substantially circular shape.

17. The puller of claim 1, wherein each of the clamping members has a second end provided with a locking hook.

18. The puller of claim 8, wherein the pivot block of each of the clamping members is rotatable in the pivot recess of the respective support seat until the two second sides of the pivot block of the pivot block of each of the clamping members align with the entrance of the respective support seat.

* * * * *